: 2,984,606
PRODUCTION OF HYDROUS ALUMINAS AND ALUMINAS

Oswald Bergmann, Camden, N.J., and Karl Torkar, Graz, Austria, assignors to Peter Spence & Sons Limited, Widnes, England, a British company, and Deutsche Gold- und Silber-Scheideanstalt vormals Roessler, Frankfurt am Main, Germany, a joint-stock company of Germany No Drawing. Filed May 8, 1958, Ser. No. 733,827
Claims priority, application Great Britain May 11, 1957
10 Claims. (Cl. 204—96)

This invention is concerned with the production of hydrous aluminas and aluminas of outstanding purity and which are particularly adapted to serve as support material for catalysts.

Alumina as such or as hydrous alumina finds application in the chemical industry, especially in oil-working and refining, as a catalyst or catalyst support. For catalytic purposes, it is important not only to have the material in the purest possible state, but in the most definite and reproducible form possible with respect to catalytic activity. Such a requirement is not confined only to the shape and size of the particles in which the catalyst or support is to be used, but applies also to its modification, through a correct choice of which a definite directing of the catalyst process is made possible or improved. Consequently, it is to be recommended, in the production of pure alumina that the form and composition of the product, with regard to the resulting modification of the oxide or hydroxide, be not left more or less to chance but, through definite production conditions, desired end products of greater possible uniformity be reproducibly obtained.

An object of the present invention is to obtain the known hydrated forms of alumina in improved state of purity by simple methods in as much as aluminium metal and water, each purified as desired, are used as starting materials and caused to interact.

In accordance with the present invention, an improved process for preparing hydrous aluminas and aluminas of high purity comprises subjecting aluminium metal to electrolysis using as electrolyte high purity water which has been rendered conductive by the addition thereto of an additive which is metal free and which is only weakly dissociated to impart slight acidity, said electrolyte being substantially free from metal ions and from objectionable anions, e.g. chloride, sulphate.

The electrolyte should not by itself appreciably attack aluminium metal, hydroxides or oxides even in the nascent state.

In one preferred form of the invention, the water is rendered conductive by the addition thereto of either carbon dioxide or hydrogen peroxide.

As a result of electrolysis with aluminium metal as cathode under the conditions described, hydrous alumina, as well as hydrogen, is produced at the cathode and is precipitated, according to the conditions of electrolysis, in a definite and reproducible form. It is believed that hydrogen ions are evolved at the cathode in the form of atomic hydrogen which combines with the aluminium to form aluminium hydride which is itself unstable and which immediately reacts with water to give hydrous alumina and hydrogen.

The essential advantage of the process according to the invention resides in the possibility of directing and influencing the structure and composition of the cathode products through a corresponding adjustment of the electrolysis conditions. Thus, by prolonged electrolysis below 30° C., and using carbon dioxide as additive, an X-ray amorphous gel-like hydrous alumina results, containing 5 to 6 moles water per mole of alumina. If, in contrast, the electrolysis is carried out at higher temperatures, e.g. 40 to 45° C., which can be achieved by using the heating effect of the current, mainly boehmite is produced at the cathode.

According to a further feature of the invention, the electrolysis is allowed to proceed for only a short time (e.g. 5 to 30 minutes), so-called impulse electrolysis, and then the cathode is left in the electrolyte a long time (some days or weeks), air being excluded. If in this method of working, hydrogen peroxide is used as conductivity promoter, in an amount to give a 5% solution of $H_2O_2$ then, at a temperature of 20° C., there results, after leaving the cathode to stand in the electrolyte, a hydrous alumina which is mainly amorphous to X-rays. At temperatures from 30° C. and upwards there results a mixture of substantially equal amounts of bayerite and boehmite.

Under corresponding conditions, except that carbon dioxide is led through the water to promote conductivity before the short period of application of electric current, there results, after leaving the cathode in the electrolyte, a well-crystallized bayerite.

The temperature at which the electrolysis is effected can be controlled satisfactorily by disposing the electrolytic cell within an outer water-filled trough which is provided with means for controlling water inflow and outflow. Thus, by controlling the rate of water circulation within said outer trough, the heating effect of the current can be controlled.

The invention will now be more particularly described by reference to several laboratory-scale experiments using, respectively, carbon dioxide and hydrogen peroxide as the electrolyte promoter.

EXAMPLE 1

Two electrodes of aluminium sheet serving as cathode with a platinum sheet between them serving as anode were arranged in a Plexiglas trough with a Plexiglas lid. Plexiglas is a registered trademark denoting a particular brand of polymethyl methacrylate. The electrodes were 0.5 mm. thick and had an effective surface of 8 x 8 cm. The electrodes were immersed in pure water, distilled in a silver condenser. In the electrolysis vessel, there was a lead-in tube for carbon dioxide and a Plexiglas stirrer. The assembled parts were carefully cleaned and degreased. The carbon dioxide was bubbled through the electrolyte at a rate of 0.1 litre per minute, and external cooling ensured that the temperature did not exceed 30° C. With an electrode distance of 1 cm. there resulted a bath potential of about 70 volts and a current strength of about 0.4 amp. The gel formed on the cathodes at the end of the electrolysis was removed from the electrolyte by centrifuging and dried in a vacuum desiccator over phosphorus pentoxide. It was amorphous to X-rays and corresponded to the composition:

$$Al_2O_3.5-6H_2O$$

EXAMPLE 2

In the arrangement described in Example 1, instead of using carbon dioxide, hydrogen peroxide was used to promote the conductivity of the water. At the beginning of the electrolysis, 30% hydrogen peroxide was added until, with a voltage of 100 volts, a current strength of about 0.1 ampere was achieved. During prolonged electrolysis, the drop in current was compensated by fresh additions of peroxide. Electrolysis at temperatures up to 10° C. gave amorphous hydrous alumina and bayerite. If the electrolysis temperature lies between 20–30° C., bayerite is obtained.

EXAMPLE 3

If the experiment described in Example 1 is carried out at a temperature of 45 to 50° C., which follows from the use of 140 volts and 0.6 amp. and a reduced rate of water circulation, mainly boehmite is obtained at the cathode.

EXAMPLE 4

A vessel of polyethylene of about 400 cc. content was filled with purest water and provided with two sheets of pure aluminum to serve as electrodes. Into the water was bubbled carbon dioxide for two minutes at 0.1 litre per minute. Then the sheets were connected to a source of direct current and electrolysed for 10 minutes with a potential of 140 volts. After stopping the current the anode was removed, while the cathode sheet, covered with water and out of contact with air, remained in the electrolysis vessel. After 10 days, a white precipitate had collected at the bottom in the neighbourhood of the cathode and was isolated by centrifuging and dried in a vacuum desiccator over phosphorus pentoxide. The precipitate comprised very well-crystallized bayerite and is obtained independently of the reaction temperature.

EXAMPLE 5

If one proceeds as in Example 4, but with the difference that as conductivity promoter a 5% solution of hydrogen peroxide is used, and introduction of carbon dioxide avoided, then, at a temperature of 20° C., there results, after leaving the cathode to stand in the electrolyte, a hydrous alumina which is mainly amorphous to X-rays. At temperatures from 30° C. upwards, there results a mixture of substantially equal amounts of bayerite and boehimte.

Platinum or aluminum can be used as anode in the activation work; for the electrolysis, however, in order to avoid passivation, platinum or other material resistant to polarisation should be used as anode.

Thus, the results of continuous electrolysis using an aluminium cathode and platinum anode and an applied voltage lying between 30 and 150 volts may be summarised as in Table I.

*Table I*

| Electrolysis Temperature | Reaction product (by X-ray) | |
| --- | --- | --- |
|  | $CO_2$ | $H_2O_2$ |
| 3° C | Amorphous | Amorphous+very little Bayerite, 3:1. |
| 10° C | do | Amorphous+Bayerite, 1:1. |
| 20° C | do | Good Bayerite. |
| 30° C | do | Good Bayerite. |
| 40° C | Very diffuse Boehmite+ little Bayerite, 2:1. | Bayerite+little Boehmite, 2:1. |
| 50° C | Diffuse Boehmite + little Bayerite, 2:1. | Bayerite+very little Boehmite, 3:1. |
| 60° C | Diffuse Boehmite+ Bayerite, 1:1. | Bayerite (not sharp). |

The results of impulse electrolysis with final time reactions, using an anode an cathode of purest aluminium, as electrolyte, purest water with (a) $CO_2$ (0.1 litre per minute) passed in, (b) so much $H_2O_2$ added that the solution is 5%, a 150 volt D.C. current which is passed for 10 minutes and thereafter the cathode left 10 days covered with electrolyte to react further, may be summarised as in Table II.

*Table II*

| Reaction Temperature | End product (X-ray analysis) | |
| --- | --- | --- |
|  | $CO_2$ | $H_2O_2$ |
| 20° C | Bayerite | Amorphous+Bayerite, 3:1. |
| 30° C | do | Bayerite+Boehmite, 1:1. |
| 40° C | do | Do. |

We claim:
1. An improved process for preparing hydrous aluminas and aluminas of high purity, comprising establishing an electrolytic cell having an aluminium cathode and an aluminum anode, charging said cell with high purity water, rendering said high purity water conductive by the addition thereto of hydrogen peroxide in an amount to give a 5% solution thereof, subjecting the aluminium metal serving as cathode to electrolysis for between 5 and 30 minutes at a temperature of substantially 20° C. and thereafter allowing the cathode to stand in the electrolyte for upwards of 10 days to yield a hydrous alumina which is mainly amorphous to X-rays.

2. An improved process for preparing hydrous aluminas and aluminas of high purity, comprising establishing an electrolytic cell having an aluminum cathode and an aluminum anode, charging said cell with high purity water, rendering said high purity water conductive by the addition thereto of hydrogen peroxide in an amount to give a 5% solution thereof, subjecting the aluminum metal serving as cathode to electrolysis for between 5 and 30 minutes at a temperature of 30° C. upwards and thereafter allowing the cathode to stand in the electrolyte for upwards of 10 days to yield a mixture of substantially equal amounts of bayerite and boehmite.

3. An electrolytic process for preparing hydrous alumina and aluminas of high purity from aluminium metal which comprises subjecting said aluminium metal to cathodic electrolytic attack in an electrolyte consisting essentially of pure water and an additive selected from the group consisting of carbon dioxide and hydrogen peroxide and which imparts slight acidity thereto and renders the water conductive, said additive in the electrolyte being essentially free of metal ions and of anions which can react with said aluminium metal and being essentially free of metal ions and anions which can react with the formed aluminas.

4. An improved process for preparing hydrous alumina and aluminas of high purity from aluminium metal which comprises establishing an electrolytic cell having an aluminium cathode and a platinum anode, charging said cell with high purity water, rendering said high purity water conductive by the addition thereto of carbon dioxide in quantity to maintain saturation within the electrolyte, and thereafter subjecting the aluminium metal to continuous electrolysis at temperatures from 30° C. downwards in order to yield a product which is amorphous to X-rays.

5. An improved process for preparing hydrous alumina and aluminas of high purity from aluminium metal which comprises establishing an electrolytic cell having an aluminium cathode and a platinum anode, charging said cell with high purity water, rendering said high purity water conductive by the addition thereto of carbon dioxide in quantity to maintain saturation within the electrolyte, and thereafter subjecting the aluminium metal to continuous electrolysis at temperatures of 40° C. upwards in order to yield a product which is mainly boehmite.

6. An improved process for preparing hydrous aluminas and aluminas of high purity, consisting essential of establishing an electrolytic cell having an aluminium cathode and a platinum anode, charging said cell with high purity water, rendering said high purity water conductive by the addition thereto of hydrogen peroxide in quantity of between 1% and 30% referred to the electrolyte and thereafter subjecting the aluminium metal serving as cathode to continuous electrolysis at normal temperatures in order to yield bayerite.

7. An improved process for preparing hydrous aluminas and aluminas of high purity, comprising establishing an electrolytic cell having an aluminium cathode and an aluminium anode, charging said cell with high purity water, rendering said high purity water conductive by the addition thereto of carbon dioxide in quantity to maintain saturation within the electrolyte, subjecting the aluminium metal serving as cathode to electrolysis and thereafter leaving the cathode to stand in the carbon dioxide-containing electrolyte for upwards of 10 days at normal temperatures to yield bayerite.

8. An improved process for preparing hydrous aluminas and aluminas of high purity, comprising establishing an electrolytic cell having an aluminium cathode and an aluminium anode, charging said cell with high purity water, rendering said high purity water conductive by passing carbon dioxide thereinto in quantity to maintain saturation within the electrolyte, subjecting the aluminium metal serving as cathode to electrolysis for between 5 and 30 minutes, leaving the cathode to stand in the electrolyte for upwards of 10 days, and thereafter separating a well crystallised bayerite.

9. An improved process for preparing hydrous aluminas and aluminas of high purity, comprising establishing an electrolytic cell having an aluminium cathode and an aluminium anode, charging said cell with high purity water, rendering said high purtiy water conductive by the addition thereto of hydrogen peroxide in an amount to give a 5% solution thereof, subjecting the aluminium metal serving as cathode to cathodic electrolysis and therafter allowing the cathode to stand in the hydrogen peroxide-containing electrolyte for upwards of 10 days to give a mixture of aluminas dependent upon the precise reaction temperature.

10. An improved process for preparing hydrous aluminas and aluminas of high purity, comprising establishing an electrolytic cell having an aluminium cathode and an aluminium anode, charging said cell with high purity water, rendering said high purity water conductive by the addition thereto of 1% to 30% hydrogen peroxide, subjecting the aluminium metal serving as cathode to cathodic electrolysis and thereafter allowing the cathode to stand in the hydrogen peroxide-containing electrolyte for upwards of 10 days to a give a mixture of aluminas dependent upon the precise reaction temperature.

References Cited in the file of this patent

UNITED STATES PATENTS

| | | |
|---|---|---|
| 2,346,609 | Riggs et al. | Apr. 11, 1944 |
| 2,447,386 | Antonoff | Aug. 17, 1948 |
| 2,667,454 | Roller | Jan. 26, 1954 |
| 2,859,148 | Altenpohl | Nov. 4, 1958 |